(12) United States Patent
Kawanishi

(10) Patent No.: US 6,324,156 B1
(45) Date of Patent: Nov. 27, 2001

(54) OPTICAL RECORDING MEDIUM HAVING CONCAVE AND CONVEX PORTIONS OF DIFFERENT REFLECTION

(75) Inventor: Yoshitaka Kawanishi, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/327,758

(22) Filed: Jun. 7, 1999

(30) Foreign Application Priority Data

Jun. 8, 1998 (JP) .................................................. 10-159307
Nov. 18, 1998 (JP) .................................................. 10-328211

(51) Int. Cl.[7] ..................................................... G11B 7/24
(52) U.S. Cl. ...................................... 369/275.1; 428/64.4
(58) Field of Search ........................... 369/275.1, 275.2, 369/275.4, 275.5, 283, 288; 428/64.1, 64.4, 64.6; 430/320, 321

(56) References Cited

U.S. PATENT DOCUMENTS

| | | | |
|---|---|---|---|
| 5,614,287 | * 3/1997 | Sekiya et al. ........................ | 428/163 |
| 5,635,267 | * 6/1997 | Yamada et al. ...................... | 428/64.4 |
| 5,817,389 | * 10/1998 | Ono ..................................... | 428/64.1 |
| 5,972,459 | * 10/1999 | Kawakubo et al. ............... | 369/275.1 |
| 6,023,451 | * 2/2000 | Kashiwagi et al. ............... | 369/275.5 |
| 6,129,968 | * 10/2000 | Ogawa ................................. | 369/288 |

FOREIGN PATENT DOCUMENTS 124211  5/1996  (JP) .
9190649  7/1997  (JP) .

* cited by examiner

*Primary Examiner*—Tan Dinh
(74) *Attorney, Agent, or Firm*—Hayes, Soloway, Hennessey, Grossman & Hage PC

(57) ABSTRACT

A recording film has recording tracks that record information and separating regions that separate neighboring recording tracks. A recording film reflects light when performing recording, playback, and erasing of information. A protective film has a pattern of surface unevenness that corresponds with the recording racks and separating regions, and has a thickness at a recording track whereby there is a change in reflectivity of the reflective film depending upon whether or not there is information recorded, and a thickness at the separating regions such that reflectivity does not depend upon whether information is recorded.

12 Claims, 8 Drawing Sheets

15: REFLECTIVE FILM
14: PROTECTIVE FILM
13: RECORDING FILM
12: PROTECTIVE FILM
11: TRANSPARENT SUBSTRATE

16: PROTECTIVE FILM
15: REFLECTIVE FILM
14: PROTECTIVE FILM
13: RECORDING FILM
12: PROTECTIVE FILM
11: TRANSPARENT SUBSTRATE

25: REFLECTIVE FILM
24: PROTECTIVE FILM
23: RECORDING FILM
22: PROTECTIVE FILM
21: TRANSPARENT SUBSTRATE

26: PROTECTIVE FILM
25: REFLECTIVE FILM
24: PROTECTIVE FILM
23: RECORDING FILM
22: PROTECTIVE FILM
21: TRANSPARENT SUBSTRATE

Fig. 13

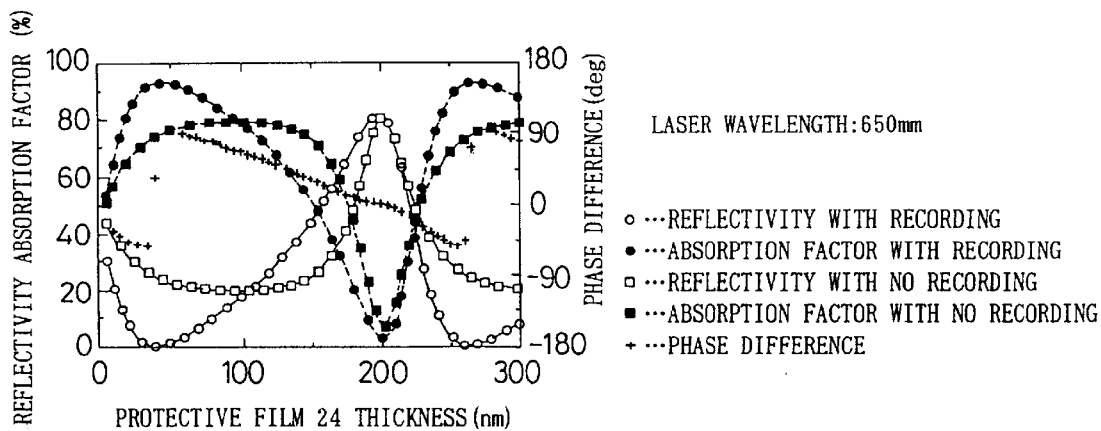

LASER WAVELENGTH: 650mm

○ ⋯REFLECTIVITY WITH RECORDING
● ⋯ABSORPTION FACTOR WITH RECORDING
□ ⋯REFLECTIVITY WITH NO RECORDING
■ ⋯ABSORPTION FACTOR WITH NO RECORDING
+ ⋯PHASE DIFFERENCE

Fig. 14

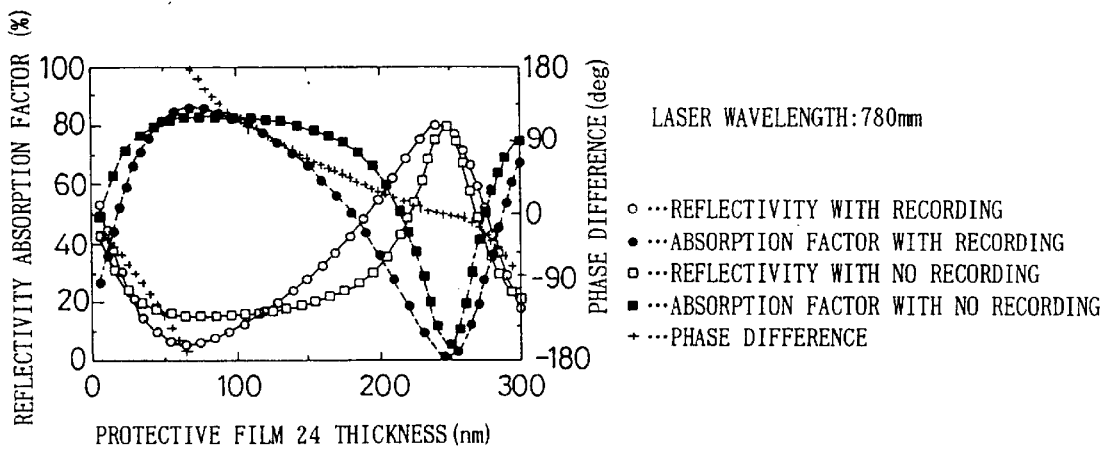

LASER WAVELENGTH: 780mm

○ ⋯REFLECTIVITY WITH RECORDING
● ⋯ABSORPTION FACTOR WITH RECORDING
□ ⋯REFLECTIVITY WITH NO RECORDING
■ ⋯ABSORPTION FACTOR WITH NO RECORDING
+ ⋯PHASE DIFFERENCE

OPTICAL RECORDING MEDIUM HAVING CONCAVE AND CONVEX PORTIONS OF DIFFERENT REFLECTION

BACKGROUND OF THE INVENTION

1. Field of the Invention

The present invention relates to an information-recording medium that uses light to recording information and to play back or erase recorded information, to a method for manufacturing such an information recording medium, to a method for recording and playing back information and to a method for erasing information, and more specifically it relates to an information-recording medium that is capable of recording high-density information and a method for manufacturing such an information-recording medium.

2. Description of the Related Art

Magneto-optical discs and DVD-RAMs are known as information-recording media which use light to recording information and to play back or erase recorded information. In information-recording media of the past, the medium was formed by recording regions (land parts) that record information and separating region (groove parts) that separate adjacently arranged recording regions from each other, and a protective film, a recording film, a protective film and a reflective film being laminated in that order along the pattern of a convex-concave configuration reflecting the land parts and the groove parts which are formed on a surface of a transparent substrate.

A laser beam is used for the recording, playback, and erasing of information, recording marks being applied to a part of the recording film corresponding to the recording region. By reducing the spacing between the land and groove parts for the purpose of recording more information, the density of the information recording is increased.

In an information-recording medium of the past, however, if the spacing between the land and groove parts is reduced in an attempt to record more information, the recording marks of recorded information spill over from the land parts to the groove parts.

When the recording marks spill over from the land parts to the groove parts, in an information erasing operation, incomplete erasure can occur, the result being that information from neighboring land parts are read simultaneously in the next play backing operation, this phenomenon being generally call crosstalk.

The information-recording medium that is disclosed in the Japanese Unexamined Patent Publication (KOKAI) No. 9-190649 reduces the crosstalk from the header region by displacing the pre-pit portion that is formed in a region placed in front of the recording region (the header region) in towards the direction of the inner circumference with respect to a center portion of the land part.

The occurrence of crosstalk in an information-recording medium of the past was an unavoidable problem when recording information at a high density.

With the information-recording medium that is disclosed in the Japanese Unexamined Patent Application publication H9-190649, although the crosstalk from the header region is reduced, crosstalk from the recording region was not reduced.

Accordingly, it is an object of the present invention to improve over the drawbacks as noted above in the prior art, by providing an information-recording medium, a method for manufacturing such an information-recording medium, a method for recording and playbacking information and a method for erasing information, so that the crosstalk generated when the play backing operation can be reduced and the recording information with high-density can be realized.

SUMMARY OF THE INVENTION

In order to achieve the above-noted object, the present invention adopts the following basic technical constitution.

Specifically, the first aspect of the present invention relates to an information-recording medium which has a recording film that records information, a reflective film, which is formed on the recording film, and which reflects light so as to record information on the recording film, play back information therefrom, or erase information and a protective film that is formed between the recording film and the reflective film, and which has a configuration so that the reflectivity of a part corresponding to the recording region of the information-recording medium will differ from each other depending upon whether or not the recording film of the recording region has information recorded thereon, while the reflectivity of a part corresponding to the separating region of the information-recording medium separating adjacently arranged recording regions from each other, is substantially uniform to each other whether or not the recording film of the separating region has information recorded thereon.

According to the present invention, the protective film is configured so that a clear distinction is made in the recording region between the condition in which information is recorded on a recording track and the condition in which information is not recorded on a recording track, while in the separating region, the distinction between the condition in which information is recorded and the condition in which information, is not recorded is not made.

The result is that it is possible to greatly reduce cross talk whereby information of adjacent recording tracks is simultaneously read, and contributing to improve density of recording information.

In accordance with the present invention, the protective film may have a thickness so that in the recording region, the reflectivity of a part corresponding to the recording region of the information-recording medium will differ from each other depending upon whether or not the recording film of the recording region has information recorded thereon, while the reflectivity of a part corresponding to the separating region of the information-recording medium is substantially uniform to each other whether or not the recording film of the separating region has information recorded thereon.

The protective film of the present invention may have a convex-concave configuration corresponding to the recording region and the separating region, respectively.

Further, in the present invention, a surface of the recording film is preferably flat, and further the reflective film may have a convex-concave configuration that is substantially the same as that of the protective film.

The recording film of the present invention, may have a convex-concave configuration that is substantially the same as that of the protective film and the protective film may fill this pattern of surface unevenness of the recording film and have a flat surface, further the surface of the reflective film may be flat.

On the other hand, a thickness of the protective film is established in accordance with at least one parameter of the group consisting of the wavelength of the light used for play back information, the material of the recording film, the material of the protective film, and the material of the reflective film.

Further, in the present invention, the protective film may have a thickness so that in a case of a light having a first wavelength being used, the reflectivity of a concaved part of the convex-concave configuration will be uniform whether or not the recording film has information recorded thereon, while the reflectivity of a convexed part thereof will differ from each other, depending upon whether or not the recording film has information recorded thereon, further in a case of a light having a second wavelength being used, the reflectivity of a convexed part of the convex-concave configuration will be uniform whether or not the recording film has information recorded thereon, while the reflectivity of a concaved part thereof will differ from each other, depending upon whether or not the recording film has information recorded thereon.

The second aspect of an information-recording medium according to the present invention can record information onto circular tracks, the medium comprises a plurality of first tracks eccentrically arranged to each other and a plurality of second tracks each being eccentrically arranged to each other and between the first tracks adjacently arranged, wherein the first tracks has different reflectivities from each other corresponding to the fact that whether or not a part of the first track has information recorded thereon, while the second tracks has substantially uniform reflectivity whether or not the second tracks have information recorded thereon, with respect to the light having the first wavelength, while with respect to the light having the second wavelength which is different from the first wavelength, the second tracks have different reflectivities from each other whether or not a part of the second track has information recorded thereon, while the first tracks have substantially uniform reflectivity, whether or not the first tracks have information recorded thereon, and further wherein the second tracks serving as a separating region for separating the adjacently arranged recording films which record information thereon, from each other, with respect to the first tracks and further wherein the first tracks serving as the separating region with respect to the second tracks.

In accordance with the present invention, the separating region which had been used with the light having a first wavelength can be used as a recording region when another light having a second wavelength is used.

Accordingly, in the present invention, it can be possible that double amount of information can be recorded compared with a case in that only one light having a fixed wavelength light is used, resulting in high density information recording.

Moreover, in the present invention, the first and second tracks may comprise a recording film which records information thereon, a protective film and a reflective film for reflecting light, and further wherein the protective film has a thickness so that with respect to a light having a first wavelength, the first tracks have different reflectivities from each other whether or not a part of the first track has information recorded thereon, while the second tracks have substantially uniform reflectivity whether or not the second tracks have information recorded thereon, further wherein, with respect to the light having the second wavelength which is different from the first wavelength, the second tracks has different reflectivities from each other whether or not a part of the second track have information recorded thereon, while the first tracks has substantially uniform reflectivity whether or not the first tracks have information recorded thereon.

The third aspect of the present invention relates to a method for manufacturing an information-recording medium and the method thereof comprises a step of forming a recording film which record information thereon, a step of forming a reflective film which reflects light so as to record information on the recording film, play back information therefrom, or erase information, on the recording film, and a step of forming a protective film between the recording film and the reflective film, the protective film having a thickness so that in the recording region, a reflectivity of a part corresponding to a recording region of an information-recording medium will differ from each other whether or not the recording film of the recording region has information recorded thereon, while the reflectivity of a part corresponding to the separating region separating the adjacently arranged recording regions from each other, of the information recording medium is substantially uniform to each other whether or not the recording film of the separating region has information recorded thereon.

According to the third aspect of the present invention, the protective film is also configured so that a clear distinction is made in the recording region between the condition in which information is recorded on a recording track and the condition in which information is not recorded on a recording track, while in the separating region, the distinction between the condition in which information is recorded and the condition in which information, is not recorded is not made.

The result is that it is possible to greatly reduce crosstalk whereby information of adjacent recording tracks is simultaneously read, and contributing to improve density of recording information.

In the third aspect of the present invention, the recording film forming step may be provided with a process for forming the recording film surface thereof being flat; the protective film forming step may be provided with a process for forming the protective film having a convex-concave configuration corresponding to the recording region and the separating region, respectively; and the reflective film forming step may be provided with a process for forming the reflective film having a convex-concave configuration being substantially identical with that of the protective film.

And in this third aspect, the protective film forming step may further comprise a step for forming a first protective film on the recording film and which having a flat surface and a step for forming a second protective film having the convex-concave configuration by forming a photoresist film on the protective film and by patterning thereof.

Further, in this third aspect, the recording film forming step may be provided with a step for forming the recording film having a convex-concave configuration corresponding to the recording region and the separating region, respectively, the protective film forming step being provided with a step for forming the protective film which fills the convex-concave configuration so as to reduce the unevenness surface flat, and further, the reflective film forming step being provided with a step for forming the reflective film having a flat surface.

The fourth aspect of the present invention relates to a method for manufacturing an information-recording medium and the method thereof comprises a step of forming a recording film having a flat surface, a step of forming a first protective film on the recording film, a step of forming a second protective film having a convex-concave configuration corresponding to recording region which record information thereon and separating regions which separate the recording regions adjacently arranged from each other, a step of forming a reflective film on the second protective film and along the convex-concave configuration formed on the second protective film, and a step of adhering a surface of the first protective film with a surface of the reflective film to each other.

The fifth aspect of the present invention relates to a method for manufacturing an information-recording medium and the method thereof comprises a step of forming a recording film having a convex-concave configuration corresponding to a recording region which records information thereon and a separating region separating the adjacently arranged recording regions from each other, a step of forming a first protective film along the convex-concave configuration formed on the recording film, a step of forming a second protective film having a flat surface, a step of forming a reflective film on the second protective film, and a step of adhering a surface of the first protective film with a surface of the reflective film to each other.

On the other hand, the sixth aspect of the present invention relates to a method for recording and playbacking information by radiating light onto an information recording medium so that information is recorded on or playbacked from the information recording medium and in that an information recording medium comprises a recording film that records information, a reflective film, which is formed on the recording film, and which reflects light so as to record information on the recording film, to play back information therefrom, or to erase information, and a protective film having a convex-concave configuration, that is formed between the recording film and the reflective film having a thickness so that in a case of a light having a first wavelength being used, the reflectivity of a concaved part of the convex-concave configuration will be uniform whether or not the recording film has information recorded thereon, while the reflectivity of a convexed part thereof will differ from each other whether or not the recording film has information recorded thereon, further in a case of a light having a second wavelength being used, the reflectivity of a convexed part of the convex-concave configuration will be uniform whether or not the recording film has information recorded thereon, while the reflectivity of a concaved part thereof will differ from each other whether or not the recording film has information recorded thereon, and the method for recording and playbacking information is performed so that the light having a first wavelength is used for recording information onto or for playing back information from a part corresponding to a convexed portion of the convex-concave configuration formed in the protective film, while the light having a second wavelength is used for recording information onto or for playing back information from a part corresponding to a concaved portion thereof.

According the present invention as mentioned above, at least two lights each having wavelength different from each other, are differently used either on the concaved portion or on the convexed portion of the convex-concave configuration of the protective film, respectively, so that information can be recorded on both the concaved portion and the convexed portion.

Further, in the present invention, when the information is played back, a light having a specific wavelength by which the reflectivity of a part of the information-recording medium corresponding to each one of the convexed portion and the concaved portion of the convex-concave configuration formed on the protective film, can be clearly differed whether or not the portions thereof has information recorded thereon, is used so as to greatly reduce the crosstalk.

Moreover, when the information is played back, the information recorded on both the concaved portion and the convexed portion of the convex-concave configuration of the protective film, can be simultaneously played back utilizing both lights having the first and the second wavelength.

The seventh aspect of the present invention relates to a method for erasing information by radiating light onto an information recording medium so that information is erased from the information recording medium and the information recording medium comprising, a recording film that records information, a reflective film, which is formed on the recording film, and which reflects light so as to erase information from the information recording medium, and recording film, to play back information therefrom, or to erase information, and a protective film having a convex-concave configuration, that is formed between the recording film and the reflective film having a thickness so that the reflectivity of a concaved part of the convex-concave configuration will be substantially uniform whether or not the recording film has information recorded thereon, while in a case of a light having a second wavelength being used, the reflectivity of a convexed part of the convex-concave configuration will be substantially uniform whether or not the recording film has information recorded thereon; wherein the method for erasing information is performed so that the light having a first wavelength is used for erasing information from a part corresponding to a concaved portion of the convex-concave configuration formed in the protective film, while the light having a second wavelength is used for erasing from a part corresponding to a convexed portion thereof.

According to the present invention, since a light the reflectivity thereof is substantially uniform whether or not any one of the concaved portion and the convexed portion of the convex-concave configuration of the protective film, has information recorded thereon, when a phase change material, for example, is used for the recording film, thermal energy given to the recording film by the light will be uniform so that overwriting operation with less residual information on the recording film, can be possible.

BRIEF DESCRIPTION OF THE DRAWINGS

FIG. 13 is a graph that shows the calculated light reflectivity and absorption factor with respect to the thickness of the protective film 24 and shows phase difference formed between an incident light and a reflected light, when a laser having a wavelength of 650 nm is radiated on the information-recording medium as shown in FIG. 7; and FIG. 14 is a graph that shows the calculated light reflectivity and absorption factor with respect to the thickness of the protective film 24 and shows phase difference formed between an incident light and a reflected light, when a laser having a wavelength of 780 nm is radiated on the information recording medium as shown in FIG. 7.

DESCRIPTION OF THE PREFERRED EMBODIMENTS

A first embodiment of the information-recording medium of the present invention is described in detail below, with references being made to relevant accompanying drawings.

Figure 1:
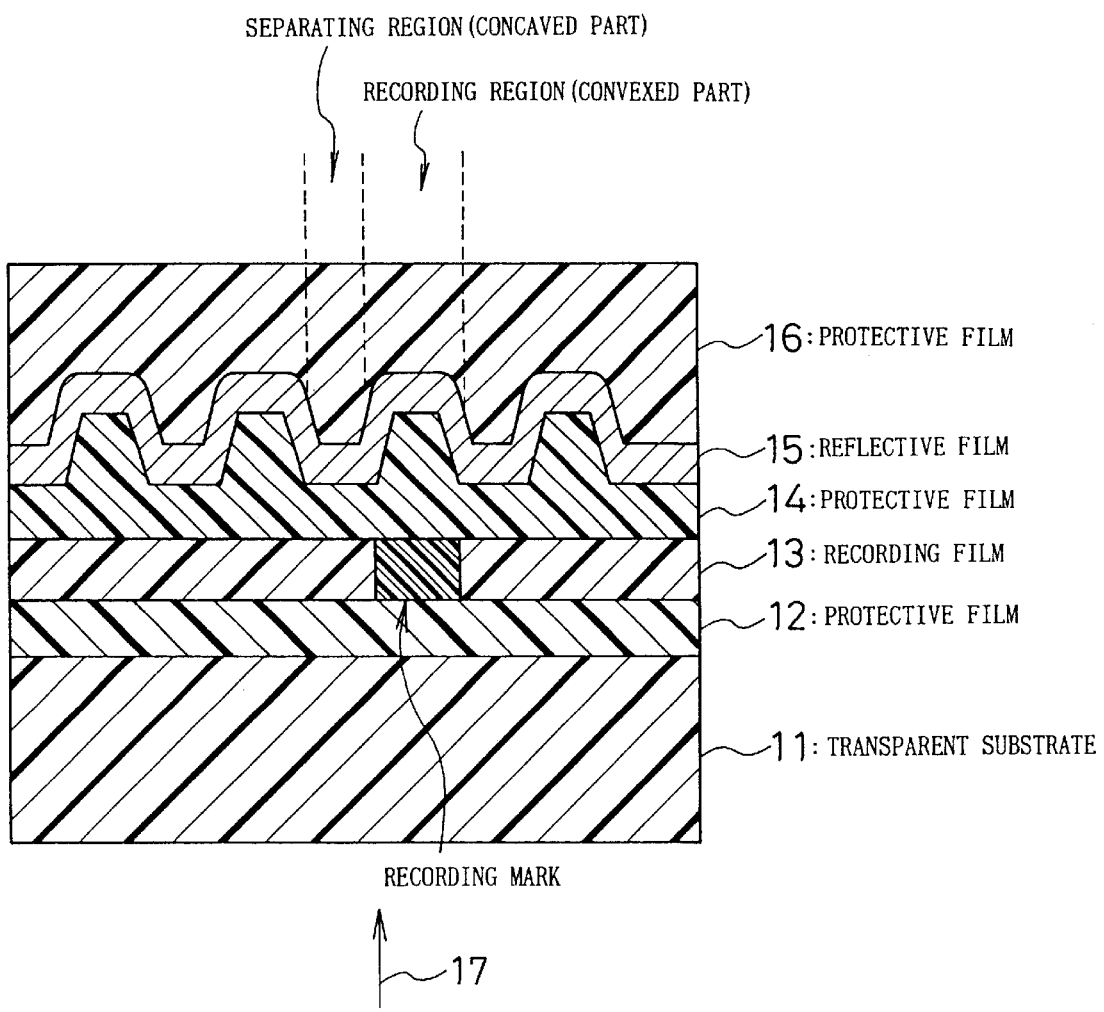
FIG. 1 is a simplified cross-section view that shows the first embodiment of the information-recording medium of the present invention.

FIG. 1 shows part of a cross-section of the information-recording medium according to the first embodiment of the present invention, and this being shown as a cross-section view cut through the center thereof by a plane that is perpendicular to the surface of the information-recording medium.

This information recording medium is formed by the lamination of a transparent substrate 11, a protective film 12, a recording film 13, a protective film 14, a reflective film 15, and a protective film 16.

The transparent substrate 11 is transparent to light and has a flat surface. The outer shape of the transparent substrate 11 can be, for example, that of a circular disc, the material thereof being polycarbonate.

The protective film 12 is formed on the transparent substrate 11, and can be made of, for example, ZnS—SiO$_2$ (a compound of zinc sulfide and silicon dioxide).

The recording film 13 is the film onto which information is recorded, this being formed on the protective film 12. The material of the recording film 13 is an optical-phase-changing component, for example, Ge—Sb—Te (a compound of germanium, antimony and tellurium).

When a laser is radiated on the optical-phase-changing component, a part of the recording film to which the laser had been radiated, is phase changed by the heat of the laser and thus such phase changed portion thereof is reduced into a record mark so that information can be recorded on the recording film, accordingly.

The protective film 14 is formed on the recording film 13 and has a convex-concave configuration.

The protective film 14, along with the protective film 12, sandwiches the recording film 13. This serves to protect the recording film 13 from thermal damage when recording, playing back, and erasing information, while also providing protection from corrosion.

The material of the protective film 14 is, for example, SiO$_2$ (silicon dioxide).

The convex-concave configuration of a surface of the protective film corresponds to a recording region on which information is recorded and a separation region for separating the adjacently arranged recording films from each other.

Note that, a convexed part having a thick thickness in the protective film 14 corresponds to the recording region and called as a recording track, while a concaved part having a thin thickness in the protective film 14 corresponds to the separating region.

As mentioned above, information is recorded on the recording film 13 with marking a record mark thereon by a laser and the record mark is recorded only on a part substantially corresponding to the recording region of the recording film 13.

The reflective film 15 is formed on the protective film 14, and uses multiple reflections of a thin disc to limit reflections from the optical disc, absorption, and transmission. It also adjusts the thermal conductivity. The material of the reflective film 15 is, for example, aluminum.

The protective film 16 is formed on the reflective film 15, and fills in the pattern of surface unevenness, so as to have a flat surface.

The material of the protective film 16 is, an UV-cured resin.

Technologies for filling the surface unevenness to form a flat surface include the bias sputtering method, CVD (Chemical Vapor Deposition), and CMP (Chemical Mechanical Polishing).

In the present invention, when information is recorded on the information-recording medium, as mentioned above, the recording film 13 is phase changed by laser and when the information as recorded on the information-recording medium should be erased, the phase changed recording film is restored to an original condition by the heat of laser generated by the laser radiated to the recording film.

On the other hand, when the information is play backed, the laser having relatively weaker power than those of the laser used for recording the information and for erasing the information, is radiated to the recording film and a variation in the reflectivity of the laser due to an existence of the record mark, is detected so as to read information.

Further, in the information recording medium of the present invention, and having such configuration as mentioned above, the reflectivity and the absorption factor of the laser radiated thereto in a direction from a transparent substrate 11 to the reflective film 15 (the direction as shown by an arrow mark 17 in FIG. 1) are dependent upon the thickness of the protective film 14.

Accordingly, in the present invention, a thickness of the protective film is established so that in the recording region (the convexed portion), a clear distinction in the reflectivity is made depending upon the fact that whether or not information is recorded on the recording film 13, while in the separating region, the distinction is not made in the reflectivity whether or not information is recorded on the recording film 13.

By doing this, even when a recording mark had been recorded with a condition in that the recording mark spill over from the recording region to the separating region, the recording mark on the separating region if any, cannot be detected as a signal of information and only the record mark recorded on the recording region can be detected.

Note that, in the present invention, a width of the signal for information as recorded on the recording region, can be narrowed making further improvement in recording density possible as well as making it possible to obtain high quality signals.

Next, a method for establishing the thickness of the protective film 14 will be explained, hereunder.

In the explanation below, the embodiment will be explained about an information-recording medium as shown in FIG. 1, in that ZnS—SiO$_2$ is used for the protective film 12, Ge—Sb—Te is used for the recording film 13, and aluminum is used for the reflective film 15 and a thickness of each one of films being set at 60 nm, 15 nm, and 80 nm, respectively.

And note that a material of the protective film 14 is SiO$_2$.

Figure 2:
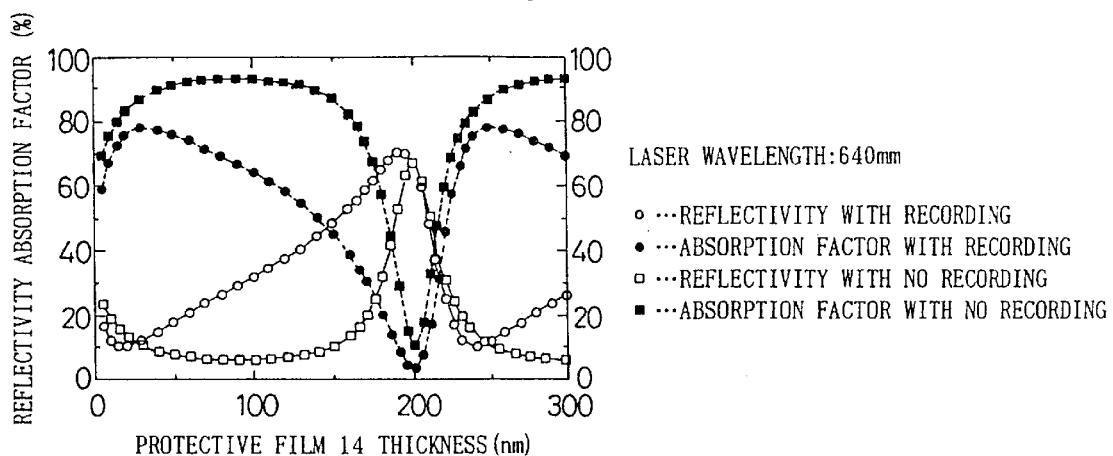
FIG. 2 is a graph that shows the calculated light reflectivity and absorption factor with respect to the thickness of the protective film 14 formed in the information-recording medium as shown in FIG. 1.

FIG. 2 shows the results of calculating the light reflectivity and absorption factor with the protective film 14, when a laser having a wavelength of 640 nm is radiated on the information-recording medium as shown in FIG. 1 along the direction as shown with arrow symbol 17 in FIG. 1.

As can be seen from FIG. 2, for a protective film 14 having a thickness of 25 nm, the reflectivity is the same whether or not information is recorded.

For a protective film 14 having a thickness in the range from 50 nm to 190 nm, there is a difference ranging between 10% and 40% between the condition in which information is recorded and the condition in which information is not recorded.

Therefore, the thickness of the protective film 14 is set to 25 nm in the separating region and to any value in the range from 50 nm to 190 nm in the recording region.

Next, a method of manufacturing an information-recording medium as mentioned above, will be described, hereunder.

Figure 3:
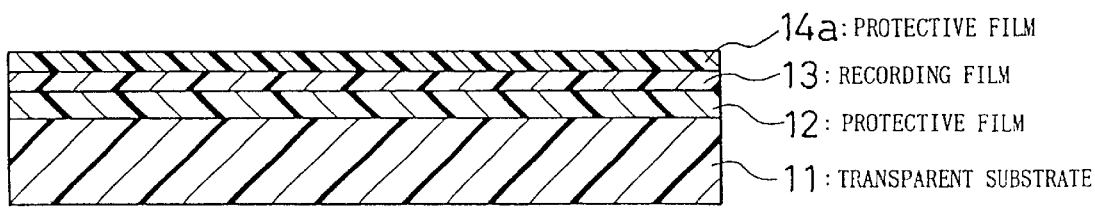
FIG. 3 is a drawing that illustrates one embodiment of a method of manufacturing an information recording medium of the present invention as shown in FIG. 1.

As shown in FIG. 3, onto a transparent substrate 11, which has a flat surface, a film of ZnS—SiO$_2$ is formed to a thickness of 60 nm, thereby forming the protective film 12.

Then, a Ge—Sb—Te film having a thickness of 15 nm is formed as the recording film 13.

Finally, a ZnS—SiO$_2$ film having a thickness of 25 nm is formed on the recording film 15, as the protective film 14a, which will form the base for the protective film 14.

Figure 4A:
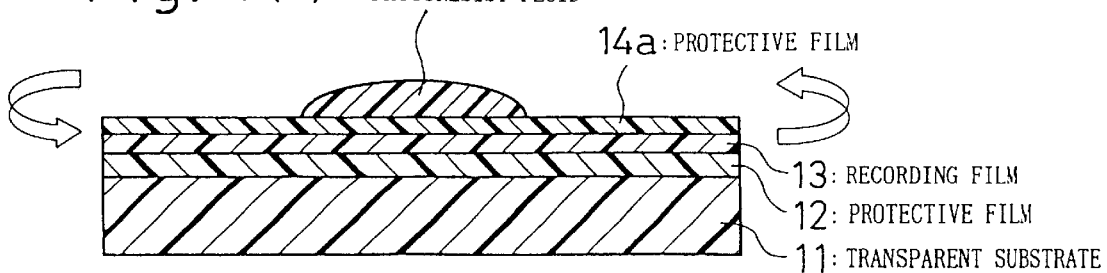
FIGS. 4(a) and 4(b) are drawings that illustrate one embodiment of a method of manufacturing an information recording medium of the present invention as shown in FIG. 1.
Figure 4B:
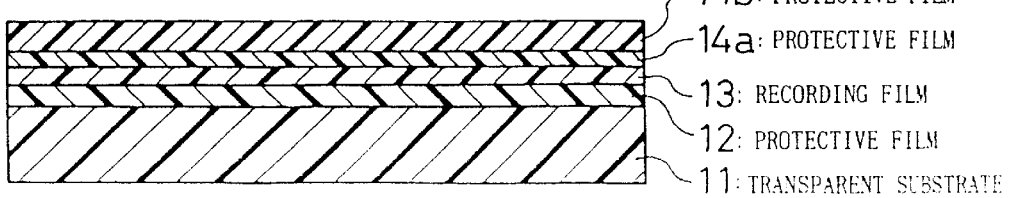

Next, as shown in FIG. 4(a), a photoresist fluid is spin-coated onto the protective film 14a so that the film thickness becomes approximately 100 nm, and the protective film 14b is formed for the purpose of forming a convex-concave configuration on the protective film 14, as shown in FIG. 4(b).

Figure 5A:
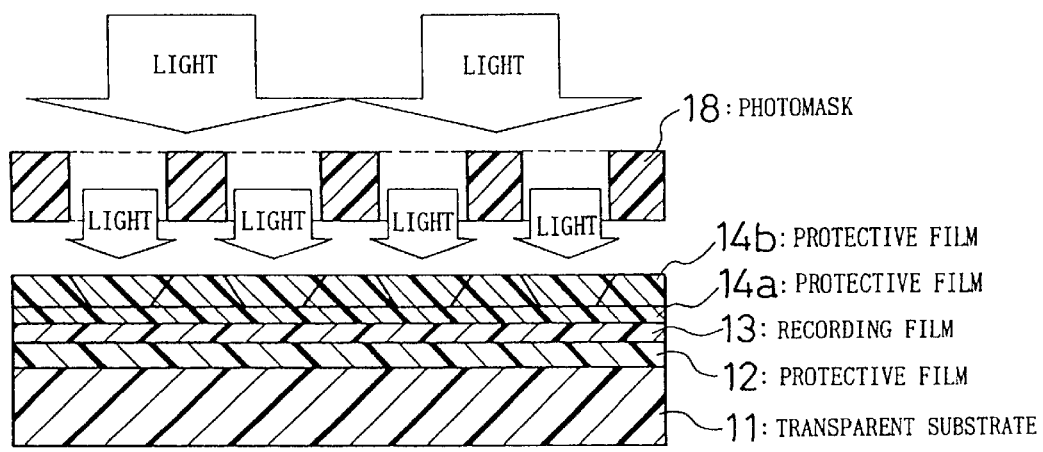
FIGS. 5(a) and 5(b) are drawings that illustrate one embodiment of a method of manufacturing an information recording medium of the present invention as shown in FIG. 1.

Next, as shown in FIG. 5(a), an exposure light beam is shined through a photomask 18 that has the pattern of the convex-concave configuration for the separating region and the recording region, so as to form a latent image of this pattern of surface unevenness on the protective film 14b.

Figure 5B:
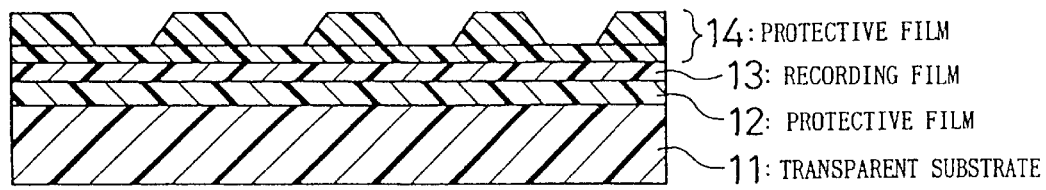

Then, as shown in FIG. 5(b), developing is done so as to form the pattern of surface unevenness on the protective film 14b. The protective film 14b and the protective film 14a then form the protective film 14 that is shown in FIG. 1.

Figure 6A:
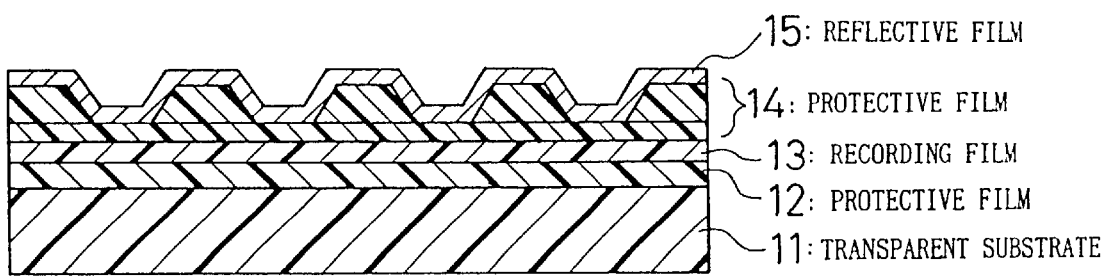
FIGS. 6(a) and 6(b) are drawings that illustrate one embodiment of a method of manufacturing an information recording medium of the present invention as shown in FIG. 1.
Figure 6B:
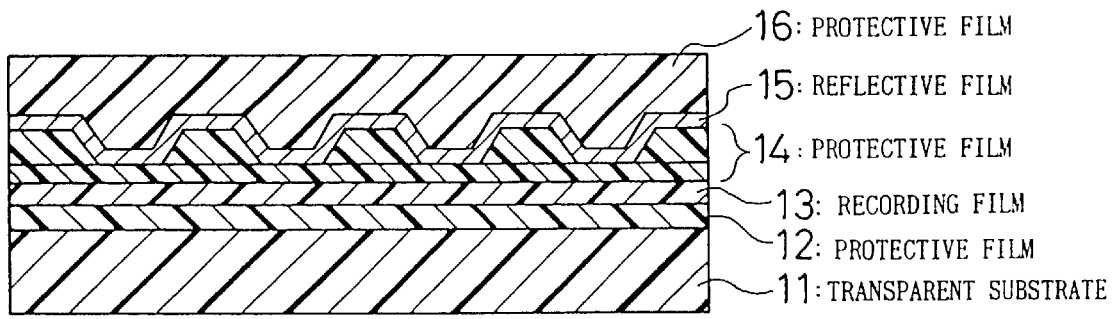

Next, as shown in FIG. 6(a), an aluminum film 15 having a thickness of 80 nm is formed onto the pattern of surface unevenness of the protective film 14. Then, as shown in FIG. 6(b), a UV-curable resin is spin-coated onto the reflective film 15, this being exposed to UV light so as to form the protective film 16, thereby completing the information-recording medium that is shown in FIG. 1.

By doing this, the record marks which are recorded a part of the information-recording medium, corresponding to the recording region (convexed portion) can only be detected as information signal.

Accordingly, it is possible to prevent crosstalk from occurring when the information is play backed and further it is possible to increase recording density for information to be recorded onto the information-recording medium.

On the other hand, although the difference in the reflectivity depends upon characteristics of pick-up devices or play back devices, for example, reflectivity can be set at more than 6%, and more preferably, at more than 9%.

In this case, reflectivity can be clearly distinguished depending upon whether or not the recording film of the recording region has information recorded thereon.

Note that, the larger the difference in reflectivity is, the more clearly, the distinction between a condition in which information has not been recorded in the information-recording medium and a condition in which information has been recorded therein, can be made.

Further, in the present invention, a thickness of the protective film 14 in the recording region, is thick, while it is thin in the separating region.

Therefore, heat generated when the information is recorded, play backed and erased, can be slowly dispersed in the recording region locating far from the reflective film 15, so that sensitivity for detecting the recording mark can be improved.

On the other hand, in the separating region locating closer to the reflective film 15, such heat can be dispersed quickly so that an amount of heat which is transmitted into the recording region located adjacent to the separating region can be reduced.

Accordingly, in the present invention, the crosstalk problem with which information (recording mark) as recorded in the recording region of the adjacently arranged to the separating region, can be greatly improved.

Next, the second embodiment of an information-recording medium will be described, with reference being made to accompanying drawings.

Figure 7:
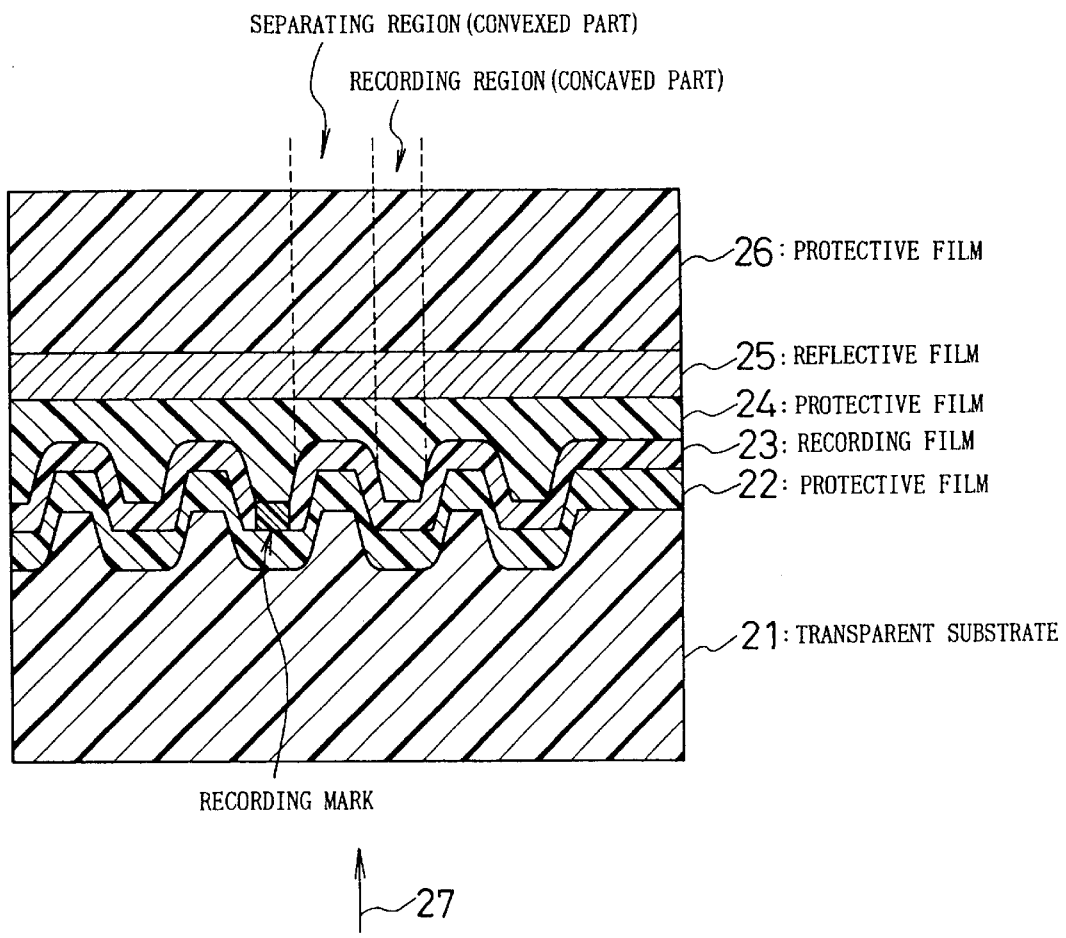
FIG. 7 is a simplified cross-section view of the second embodiment of the information-recording medium of the present invention.

FIG. 7 shows part of a cross-section of an information-recording medium according to the second embodiment of the present invention, this being shown as a cross-section view cut through the center thereof by a plane that is perpendicular to the surface of the information-recording medium.

This information-recording medium is formed by the lamination of a transparent substrate 21, a protective film 22, a recording film 23, a protective film 24, a reflective film 25, and a protective film 26.

The transparent substrate 21 is transparent to light and has on its surface a convex-concave configuration. The outer shape of the transparent substrate 21 can be, for example, that of a circular disc, the material thereof being polycarbonate.

Note that the convex-concave configuration provided on a surface of the transparent substrate 21 corresponds to the recording region on which information is recorded and the separating region which separates the adjacently arranged recording regions from each other.

And in the present invention, a part corresponding to the recording region is the concaved portion (at which the thickness of the protective film 24 is thick) and called as recording tracks, while a part corresponding to the separating region is the convexed portion (at which the thickness of the protective film 24 is thin).

Information can be recorded on the recording film 13 by recording a recording mark thereon utilizing light energy and this recording mark is substantially recorded only on the part corresponding to the recording region of the recording film 13.

The protective film 22 is formed onto the pattern of surface unevenness of the transparent substrate 21, and the material of this film is, for example, ZnS—SiO$_2$ (compound of zinc sulfide and silicon dioxide).

The recording film 23 is a film that records information, this being formed on the protective film 22. The material of the recording film 23 is a phase change component, for example, Ge—Sb—Te (compound of germanium, antimony, and tellurium).

When a laser is radiated onto the recording film 23, a part of the recording film to which the laser had been radiated, will be phase-changed by heat of the laser so that the part thus phase-changed becomes a recording mark with which information can be recorded.

The protective film 24 is formed on the recording film 23 and fills in the pattern of surface unevenness thereof, so as to form a flat surface, this protective film 24 serving with the protective film 22 to sandwich the recording film 23, thereby protecting the recording film 23 from thermal damage when recording, playing back, and erasing information, while also providing protection from corrosion.

The material of the protective film 24 is, for example SiO$_2$ (silicon dioxide). Technologies for filling the surface unevenness to form a flat surface include the bias sputtering method, CVD, and CMP.

The reflective film 25 is formed on the protective film 24, and uses multiple reflections of a thin disc to limit reflections from the optical disc, absorption, and transmission. It also adjusts the thermal conductivity. The material of the reflective film 25 is, for example, aluminum.

The protective film 6 is formed on the recording film 25, and is made of a UV cured resin.

When information is to be recorded on the information recording medium, as the similar way to that of the previous embodiment, the recording film 23 is phase-changed utilizing a laser and on the other hand, when the information is to be erased, the laser is again radiated on the information recording medium so as to restore the phase changed film to the original one utilizing heat of the laser.

On the other hand, when the information is to be play backed, a laser having a relatively weak optical energy compared with those as used in recording information or in erasing sane, is used and is radiated thereto, and the variation in the reflectivity thereof caused by the existence of the record mark so as to read out the information.

Further, in the above-mentioned information-recording medium, the reflectivity and absorption factor of the laser which had been radiated thereto along a direction toward from the transparent substrate 21 to the reflective film 25 (as shown by an arrow symbol 27 in FIG. 7), depend upon a thickness of the protective film 24.

Accordingly, in the present invention, the thickness of the protective film 24 can be established so that a clear distinction is made in the recording region (concaved portion) between the condition in which information is recorded on a recording film 23 and the condition in which information is not recorded on a recording film 23, while in the separating region (convexed portion), the distinction between the condition in which information is recorded and the condition in which information is not recorded, is not made.

By doing this, even when a recording mark had been recorded with a condition in that the recording mark spill over from the recording region to the separating region, the recording mark on the separating region if any, cannot be detected as a signal of information and only the recording mark recorded on the recording region can be detected.

Note that, in the present invention, a width of the signal for information as recorded on the recording region, can be narrowed making an further improving in recording density possible as well as making it possible to obtain high quality signals.

Next, the method of setting the thickness of the protective film 24 will be described, hereunder.

In the following embodiment, with respect to an information-recording medium as shown in FIG. 7, Zn—SiO$_2$ is used for the protective film 22, G3—Sb—Te is used for the recording film 23 and aluminum is used for the recording film 25.

And in that, the thickness of each one of the abovementioned films are set at 170 nm, 15 nm, and 80 nm, respectively.

Note that a material of the protective film 24 is SiO$_2$

Figure 8:
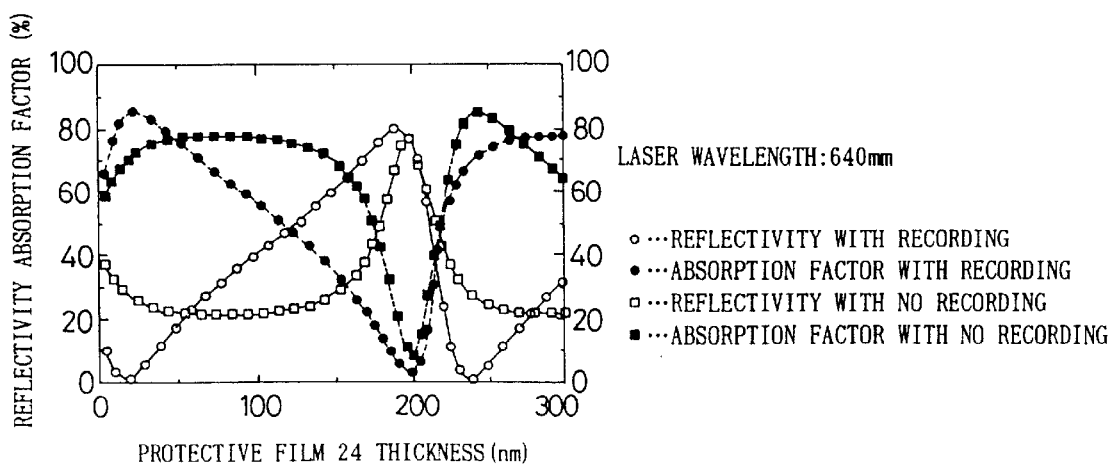
FIG. 8 is a graph that shows the calculated light reflectivity and absorption factor with respect to the thickness of the protective film 24 formed in the second embodiment of the information-recording medium of the present invention as shown in FIG. 7.

FIG. 8 shows the results of calculating the light reflectivity and absorption factor of the protective film 24, with changing the thickness thereof using light of a wavelength of 640 nm radiated to the information-recording medium as shown in FIG. 7, in the direction shown by the arrow 27 as shown in FIG. 1.

As can be seen from FIG. 8, for a protective film 24 having a thickness of 55 nm, the reflectivity is the same whether or not information is recorded. For a protective film 14 having a thickness in the range from 80 nm to 190 nm, there is a difference ranging between 10% and 38% between the condition in which information is recorded and the condition in which information is not recorded. Therefore, the thickness of the protective film 24 is set to 55 nm in the groove parts and to any value in the range from 80 nm to 190 nm in the recording track parts.

Next, a method of manufacturing an information-recording medium according to the present invention will be described, hereunder.

Figure 9:
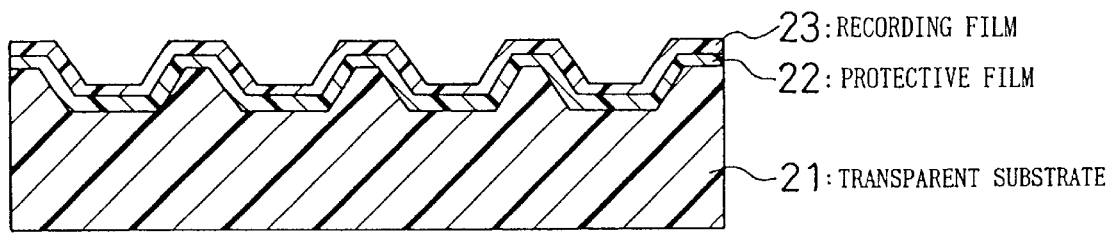
FIG. 9 is a drawing that illustrates another embodiment of a method of manufacturing an information recording medium of the present invention as shown in FIG. 7.

As shown in FIG. 9, onto a transparent substrate 21 that has on its surface a convex-concave configuration, a protective film 22 of ZnS—SiO$_2$ is formed to a thickness of 170 nm.

When this is done, the surface unevenness of formed by the convex-concave configuration of the transparent substrate 21 is made such that the height of the convexed portion (a separating region) is within the range from 25 nm to 135 nm.

Then, a G3—Sb—Te film having a thickness of 15 nm is formed on the protective film 22 as the recording film 23.

Figure 10A:
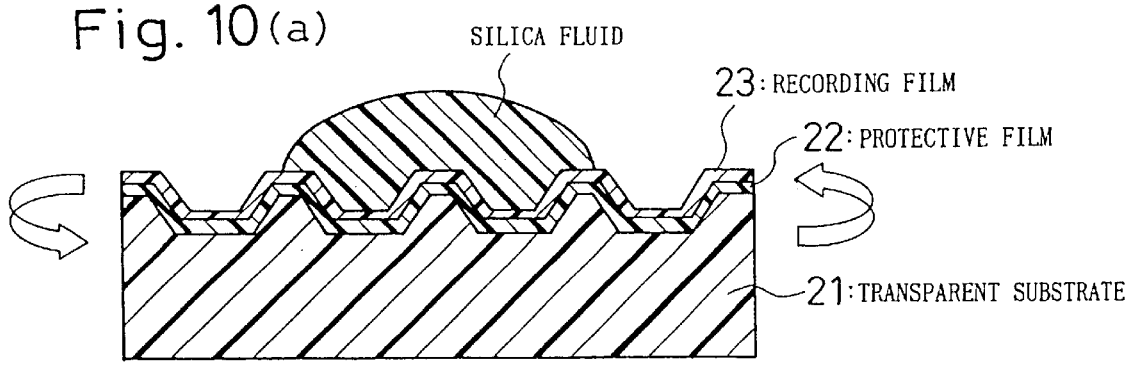
FIGS. 10(a) and 10(b) are drawings that illustrate another embodiment of a method of manufacturing an information recording medium of the present invention as shown in FIG. 7.
Figure 10B:
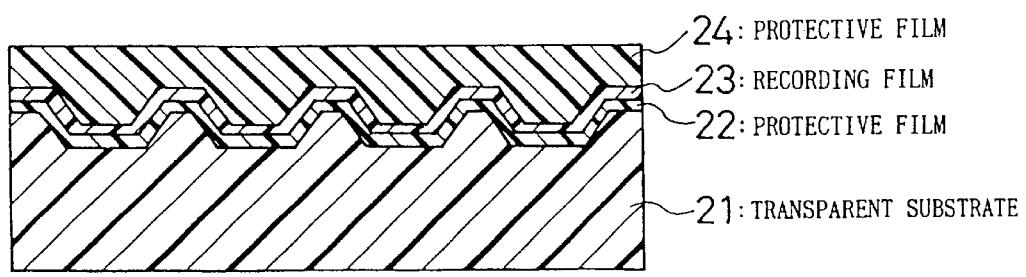

Next, as shown in FIG. 10(a), a silica fluid (solution of silicon dioxide) is spin-coated onto the recording film 23 such that the film thickness on the convexed portion thereof becomes 55 nm, thereby forming the protective film 24, as shown in FIG. 10(b).

Figure 11:
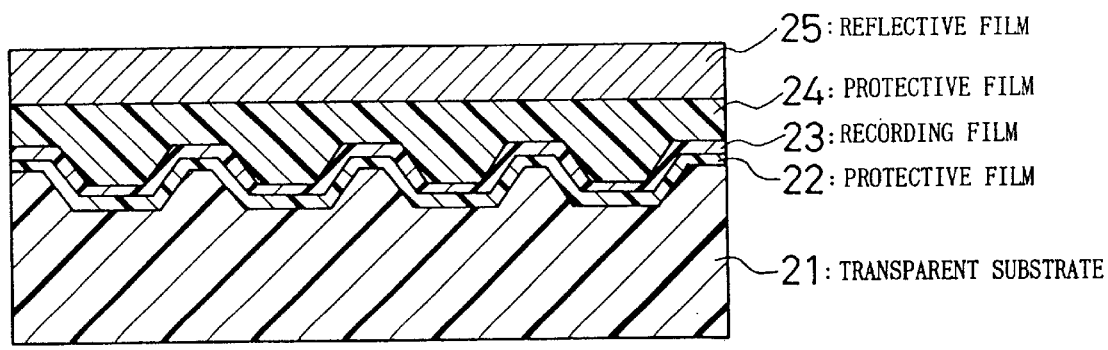
FIG. 11 is a drawing that illustrates another embodiment of a method of manufacturing an information recording medium of the present invention as shown in FIG. 7.

Next, as shown in FIG. 11, an aluminum film having a thickness of 80 nm is formed as the reflective film 25 on the protective film 24.

Figure 12:
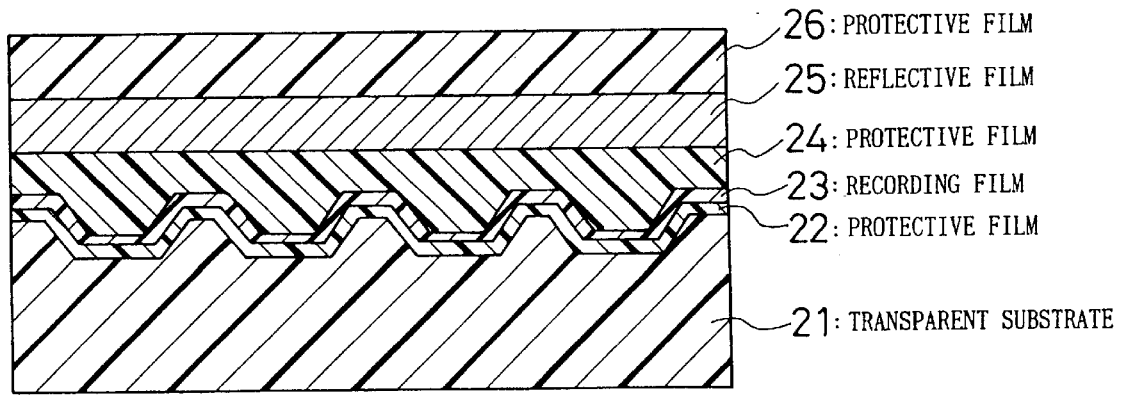
FIG. 12 is a drawing that illustrates another embodiment of a method of manufacturing an information recording medium of the present invention as shown in FIG. 7.

Next, as shown in FIG. 12, a UV-curable resin is spin-coated onto the recording film 25 and this is exposed to UV light, thereby forming the protective film 26 and completing the fabrication of the information-recording medium as shown in FIG. 7.

By doing this, the recording marks which are recorded a part of the information-recording medium, corresponding to the recording region (convexed portion) can only be detected as information signal.

Accordingly, it is possible to prevent crosstalk from occurring when information is play backed and further it is possible to increase recording density for information to be recorded onto the information-recording medium.

On the other hand, although the difference in the reflectivity depends upon characteristics of pick-up devices or play back devices, for example, reflectivity can be set at more than 6%, and more preferably, at more than 9%.

In this case, reflectivity can be clearly distinguished whether or not the recording film of the recording region has information recorded thereon.

Note that, the larger the difference in reflectivity is, the more clearly, the distinction between a condition in which information has not been recorded in the information-recording medium and a condition in which information has been recorded therein, can be made.

Further, in the present invention, a thickness of the protective film 24 in the recording region, is thick, while it is thin in the separating region.

Therefore, heat generated when the information is recorded, play backed and erased, can be slowly dispersed in the recording region locating far from the reflective film 25, so that sensitivity for detecting the recording mark can be improved.

On the other hand, in the separating region locating closer to the reflective film 25, such heat can be dispersed quickly so that an amount of heat which is transmitted into the recording region located adjacent to the separating region can be reduced.

Accordingly, in the present invention, the crosstalk problem with which information (recording mark) as recorded in the recording region of the adjacently arranged to the separating region, can be greatly improved.

Next, a third embodiment of the information-recording medium of the present invention will be explained hereunder with reference to the attached drawings.

A construction, materials of each one of films as used therein and a method for producing same of the information-recording medium are substantially identical to those as shown in the previously explained embodiments of the present invention.

In the information-recording medium of this embodiment, when a first laser having wavelength of λ1 is used, for example, the convex-concave configuration can be established so that the concaved portion thereof corresponds to the recording region, while the convexed portion thereof corresponds to the separating region while when a second laser having wavelength of λ2 is used, for example, the convex-concave configuration can be established so that the concaved portion thereof corresponds to the separating region, while the convexed portion thereof corresponds to the recording region.

Note that when a wavelength of the laser as used is changed, the thickness of the protective film 14 or 24 is preferably re-established so as to replace the separating region and the recording region mutually with each other.

Next, a method for establishing a thickness of the protective film 24 of the information-recording medium as shown in the third embodiment above, will be explained, hereunder.

In the information-recording medium as shown in FIG. 7, $ZnSiO_2$ is used for the protective film 22, G3—Sb—Te is used for the recording film 23 and aluminum is used for the recording film 25.

And in that, the thickness of each one of the above-mentioned films are set at 150 nm, 15 nm, and 80 nm, respectively.

Note that in this embodiment, $SiO_2$ is used for the protective film 24.

FIG. 13 shows the results of calculating the light reflectivity and absorption factor of the protective film 24 and a phase difference between an incident light and a reflected light, with changing the thickness thereof and using light of a wavelength of 650 nm radiated to the information-recording medium as shown in FIG. 7, in the direction shown by the arrow 27 as shown in FIG. 7.

On the other hand, FIG. 14 shows the results of calculating the light reflectivity and absorption factor of the protective film 24 and a phase difference between an incident light and a reflected light, with changing the thickness thereof and using light of a wavelength of 780 nm radiated to the information-recording medium as shown in FIG. 7, in the direction shown by the arrow 27 as shown in FIG. 7.

As can be seen from FIG. 13, when the thickness of the protective film 24 is within a range of 200~230 nm, reflectivity is substantially the same, to each other whether or not information is recorded and more over the phase difference will be set at zero (0).

On the other hand, when the thickness of the protective film 24 is within a range of 245~255 nm, the reflectivity thereof shows about 30% difference between a condition in that information had been recorded and a condition in that information had not been recorded.

While as can be seen from FIG. 14, when the thickness of the protective film 24 is within a range of 245~255 nm, reflectivity is substantially the same to each other whether or not information is recorded and more over the phase difference will be set at zero (0).

On the other hand, when the thickness of the protective film 24 is within a range of 200~230 nm, reflectivity thereof shows about 25% difference between a condition in that information had been recorded and a condition in that information had not been recorded.

Based upon this calculation results, the thickness of the protective film 24 is established so that the thickness of a part of the protective film 24 corresponding to the concaved portion is set at within a range of 245~255 nm and while the thickness of the convexed portion thereof is set at within a range of 200~230 nm.

By establishing the thickness of the protective film 24 as mentioned above, when a laser having a wavelength of 650 nm is used, the convexed portion corresponds to the separating region and the concaved portion corresponds to the recording region.

And when a laser having a wavelength of 780 nm is used, the concaved portion corresponds to the separating region and the convexed portion corresponds to the recording region.

Note that, when the wavelength of a laser is changed from 650 nm to 780 nm, the separating region and the recording region thereof can be mutually replaced with each other.

As shown in FIG. 13, when a laser having a wavelength of 650 nm is used, reflectivity of the concaved portion that is a recording region and before information will be recorded shows high level, while reflectivity thereof after information had been recorded shows low level.

On the other hand, as shown in FIG. 14, when a laser having a wavelength of 780 nm is used, reflectivity of the convexed portion that is a recording region and before information will be recorded shows low level, while reflectivity thereof after information had been recorded shows high level.

This fact shows that a configuration of changing reflectivity between a time before information is to be recorded and a time after information had been recorded is reversed between a case in which a laser having a wavelength of 650 nm is used and a case in which a laser having a wavelength of 780 nm is used.

Accordingly, when both lasers having wavelength of 650 nm and having a wavelength of 780 nm, respectively, are simultaneously used, each of the recording region can be easily distinguished by checking such configuration of change in reflectivity.

As mentioned above, in the present invention, both of the concaved portion and the convexed portion of the convex-concave configuration can be used as the recording region, double amount of information can be recorded on the information-recording medium comparing with previous embodiment in that information can only be recorded on only one of the concaved portion or the convexed portion of the convex-concave configuration.

Further, in the present invention, when a laser having a wavelength of 650 nm is used, only the recording mark recorded on a part corresponding to the concaved portion (that is a recording region for wavelength of 650 nm) can be detected as a signal of information to be read out, while when a laser having a wavelength of 780 nm is used, only the recording mark recorded on a part corresponding to the convexed portion (that is a recording region for wavelength of 780 nm) can be detected as a signal of information to be read out.

Therefore, when information is to be play backed, by radiating both lasers having the wavelength of 650 nm and 780 nm, respectively, to the information-recording medium of the present invention, the information as separately recorded on both of the concaved portion and the convexed portion, respectively, can be simultaneously played back.

By doing this, doubled amount of information can be played back within the same play back period as a period for playing back information only from the concaved portion or the convexed portion thereof.

Accordingly, in the third embodiment of the present invention, the cross talk problem which will be generated in play backing performance can be effectively avoided and further it is possible to improve recording density of information in an information-recording medium.

Note that, in this third embodiment, when at least two lasers having respective wavelength being different from each other, are simultaneously radiated to an information-recording medium, some kind of filters or the like which can selectively pass through lights having specific wavelength, respectively, should be installed in a pick-up device or a play backing device.

Further, in the present invention, a wavelength of a laser which is used for recording and playing back information nay be different from a wavelength of a separate laser which is used for erasing information.

For example, information may be recorded on a concaved portion (that is the recording region for a laser having a wavelength of 650 nm) utilizing a laser having a wavelength of 650 nm and the information as recorded on the concaved portion may be played back utilizing a laser having a wavelength of 650 nm.

And the same information as recorded on the concaved portion may be erased utilizing a laser having a wavelength of 780 nm.

Note that, when a laser having a wavelength of 780 nm is used to the concaved portion, the reflectivity and the absorption factor are substantially same to each other whether or not the recording film of the separating region has information recorded thereon.

Note that in the present invention, the heat applied to the information-recording medium 23 will be substantially same to each other whether or not the recording film of the separating region has information recorded thereon and thus crystal in the information-recording medium 23 can be uniform.

Accordingly, in the present invention, overwrite with less residual information (record mark) after an erasing operation had been carried out, can be realized.

Further note that, in a case when the information-recording medium as shown in the first embodiment of the present invention, is used, and if when a thickness of a protective film 14 was established so that when a laser having a wavelength of $\lambda 1$ is used, the concaved portion and the convexed portion of the convex-concave configuration had made corresponded to the recording region and the separating region, respectively, and when a laser having a wavelength of $\lambda 2$ is used, the concaved portion and the convexed portion thereof had made corresponded to the separating region and the recording region, respectively, the same effect as mentioned above with respect to the third embodiment can be obtained. Note that, the materials of the protective film 12, 22, the recording film 13, 23, the protective film 14, 24, and the reflective film 15, 25, are not restricted to the materials noted above, and can be other materials than those listed, if they posses the same functions.

For example, the protective film can be made of aluminum oxide, titanium oxide, titanium nitride, silicon nitride, silicon oxide, or yttrium oxide or other transparent material, a resist such as a photoresist, a UV-cured resist or a combination thereof.

The recording film 13 can also be made of In—Sb—Te (compound of indium, antimony, and tellurium), Ge—Te (a compound of germanium and tellurium), or the like. The reflective film 15 can be made, for example, of gold, silver, or copper.

Further note that it is possible to manufacture the information-recording medium of the first embodiment of the present invention by other methods.

For example, although in the above-noted manufacturing method, the sequence of formation of films onto a first transparent substrate was the protective film 12, followed by the recording film 13, the protective film 14, and simultaneously with this, the protective film 16 and the reflective film 15 are formed in this order on a surface of a second transparent substrate having convex-concave configuration corresponding to a recording region and a separating region, respectively, and along with the convex-concave configuration.

And thereafter, it is also possible, for example, to adhere the protective film 14 and the reflective film 15 to each other with the protective film serving as an adhesive.

On the other hand, it should also be noted that it is possible to manufacture the information-recording medium of the second embodiment of the present invention by other methods.

For example, a first transparent substrate 22 having a surface on which a convex-concave configuration is provided is formed first and then the recording film 23 and the protective film 24 are stacked thereon in this order.

Simultaneously with this, the protective film 26 and the reflective film 25 are stacked in this order on a flat surface of a second transparent substrate.

After that, the protective film 24 and the reflective film 25 are adhered to each other with the protective film serving as an adhesive.

Additionally, in the first embodiment of the present invention, the convex-concave configuration of the protective film 14 was formed by developing, it is also possible to form this configuration by dry etching.

Additionally, in the second embodiment of the present invention, although a protective film 22 was formed on the transparent substrate 21 that has a convex-concave configuration, it is also possible to use a transparent substrate 21 that has a flat surface, and to apply a photoresist or the like to the protective film 22 thereover, using dry etching to form the convex-concave configuration.

In the first and the second embodiments, although a part of the protective film 14, 24 each of which has a thick thickness (corresponding to a convexed portion and a concaved portion, respectively) is used as a recording region, a part of the protective film 14, 24 each of which has a thin thickness corresponding to a concaved portion and a convexed portion, respectively) may be used as a recording region.

However, in this embodiment, the thickness of the protective films 14, 24, should be established so that the reflectivity in the recording region will be substantially uniform to each other whether or not the recording film has information recorded thereon and while in the separating region, the reflectivity must be clearly distinct from each other whether or not the recording film has information recorded thereon.

The wavelength of the laser used can be any wavelength that is suitable for the handling of information that is recorded on the information-recording medium.

Note, however, that the thickness of the protective film 14, 24 must be established by either experimentation or by theoretical calculation such that there is a clear distinction in reflectivity in a recording region between the condition in which information is recorded and the condition in which no information is recorded, but one in which there is no such distinction in a separating region.

As described in detail above, according to the information-recording medium of the present invention, the thickness of the protective film is established at each one of parts which correspond to the recording region and the separating region, respectively.

And thus, in the present invention, there is a clear distinction between the condition in which information is recorded on an information-recording medium and the condition in which information is not recorded in the recording region, but no distinction in the separating region.

By virtue of this, so called cross talk problem under which information as recorded on a neighbouring recording region is erroneously read out, will be reduced and it is also possible to manufacture an information-recording medium that is capable of high-density information recording.

What is claimed is:

1. An information recording medium comprising:
   a recording film that records information;
   a reflective film, formed on said recording film, for reflecting light so as to record information on said recording film, play back information therefrom, or erase information;
   and a protective film formed between said recording film and said reflective film, and which has a configuration such that reflectivity of a part corresponding to a recording region of said information-recording medium will differ from each other depending upon whether or not said recording film of said recording region has information recorded thereon, while reflectivity of a part corresponding to a separating region of said information-recording medium separating adjacently arranged recording regions from each other, is substantially uniform to each other whether or not said recording film of said separating region has information recorded thereon, wherein the recording film has a flat surface, and further wherein said reflective film has a convex-concave configuration that substantially matches that of said protective film.

2. An information-recording medium according to claim 1, wherein said protective film has a thickness such that in said recording region, said reflectivity of a part corresponding to said recording region of said information-recording medium will differ from each other depending upon whether or not said recording film of said recording region has information recorded thereon, while said reflectivity of a part corresponding to said separating region of said information-recording medium is substantially uniform to each other whether or not said recording film of said separating region has information recorded thereon.

3. An information-recording medium according to claim 2, wherein said protective film has a convex-concave configuration substantially matching that of said recording region and said separating region, respectively.

4. An information-recording medium according to claim 2, wherein the protective film has a thickness which is established in accordance with at least one parameter selected from the group consisting of the wavelength of the light used for play back information, the material of the recording film, the material of the protective film, and the material of the reflective film.

5. An information-recording medium according to claim 3, wherein said protective film has a thickness such that reflectivity of a concave part of said convex-concave configuration to light of a first wavelength will be uniform whether or not said recording film has information recorded thereon, while reflectivity of a convex part thereof will differ from each other, depending upon whether or not said recording film has information recorded thereon, and reflectivity of a convex part of said convex-concave configuration to light of a second wavelength will be uniform whether or not said recording film has information recorded thereon, while the reflectivity of a concave part thereof will differ from each other, depending upon whether or not said recording film has information recorded thereon.

6. An information-recording medium for recording information onto circular tracks, said medium comprising a plurality of first tracks eccentrically arranged to each other and a plurality of second tracks each eccentrically arranged to each other and between said first tracks, wherein said first tracks have different reflectivities from each other whether or not a part of said first track has information recorded thereon, while said second tracks have substantially uniform reflectivity whether or not said second tracks have information recorded thereon, with respect to light having a first wavelength, which with respect to light having a second wavelength which is different from said first wavelength, said second tracks have different reflectivities from each other whether or not a part of said second track has information recorded thereon, while said first tracks have substantially uniform reflectivity whether or not said first tracks have information recorded thereon, and further wherein said second tracks serve as a separating region for separating adjacently arranged recording films which record information thereon, from each other, with respect to said first tracks, and wherein said first tracks serve as a separating region with respect to said second tracks, wherein said first and second tracks comprise a recording film for recording information thereon, a protective film and a reflective film for reflecting light, wherein said protective film has a thickness so that with respect to light having a first wavelength, said first tracks have different reflectivities from each other whether or not a part of said first tracks have information recorded thereon, while said second tracks have substantially uniform reflectivity whether or not said second tracks have information recorded thereon, and wherein, with respect to light having a second wavelength which is different from said first wavelength, said second tracks have different reflectivities from each other whether or not a part of said second tracks have information recorded thereon, while said first tracks have substantially uniform reflectivity whether or not said first tracks have information recorded thereon, and wherein the recording film has a flat surface, and further wherein said reflective film has a convex-concave configuration that substantially matches that of said protective film.

7. An information recording medium comprising:

a recording film that records information;

a reflective film, formed on said recording film, for reflecting light so as to record information on said recording film, play back information therefrom, or erase information;

and a protective film formed between said recording film and said reflective film, and which has a configuration such that reflectivity of a part corresponding to a recording region of said information-recording medium will differ from each other depending upon whether or not said recording film of said recording region has information recorded thereon, while reflectivity of a part corresponding to a separating region of said information-recording medium separating adjacently arranged recording regions from each other, is substantially uniform to each other whether or not said recording film of said separating region has information recorded thereon, wherein said recording film has a convex-concave surface unevenness that substantially matches that of said protective film, and wherein said protective film fills said surface unevenness to a flat surface, the surface of said reflective film being flat.

8. An information-recording medium according to claim 7, wherein said protective film has a thickness such that in said recording region, said reflectivity of a part corresponding to said recording region of said information-recording medium will differ from each other depending upon whether or not said recording film of said recording region has information recorded thereon, while said reflectivity of a part corresponding to said separating region of said information-recording medium is substantially uniform to each other whether or not said recording film of said separating region has information recorded thereon.

9. An information-recording medium according to claim 8, wherein said protective film has a convex-concave configuration substantially matching that of said recording region and said separating region, respectively.

10. An information-recording medium according to claim 8, wherein the protective film has a thickness which is established in accordance with at least one parameter selected from the group consisting of the wavelength of the light used for play back information, the material of the recording film, the material of the protective film, and the material of the reflective film.

11. An information-recording medium according to claim 9, wherein said protective film has a thickness such that reflectivity of a concave part of said convex-concave configuration to light of a first wavelength will be uniform whether or not said recording film has information recorded thereon, while reflectivity of a convex part thereof will differ from each other, depending upon whether or not said recording film has information recorded thereon, and reflectivity of a convex part of said convex-concave configuration to light of a second wavelength will be uniform whether or not said recording film has information recorded thereon, while the reflectivity of a concave part thereof will differ from each other, depending upon whether or not said recording film has information recorded thereon.

12. An information-recording medium for recording information onto circular tracks, said medium comprising a plurality of first tracks eccentrically arranged to each other and a plurality of second tracks each eccentrically arranged to each other and between said first tracks, wherein said first tracks have different reflectivities from each other whether or not a part of said first track has information recorded thereon, while said second tracks have substantially uniform reflectivity whether or not said second tracks have information recorded thereon, with respect to light having a first wavelength, which with respect to light having a second wavelength which is different from said first wavelength, said second tracks have different reflectivities from each other whether or not a part of said second track has information recorded thereon, while said first tracks have substantially uniform reflectivity whether or not said first tracks have information recorded thereon, and further wherein said second tracks serve as a separating region for separating adjacently arranged recording films which record information thereon, from each other, with respect to said first tracks, and wherein said first tracks serve as a separating region with respect to said second tracks, wherein said first and second tracks comprise a recording film for recording information thereon, a protective film and a reflective film for reflecting light, wherein said protective film has a thickness so that with respect to light having a first wavelength, said first tracks have different reflectivities from each other whether or not a part of said first tracks have information recorded thereon, while said second tracks have substantially uniform reflectivity whether or not said second tracks have information recorded thereon, and wherein, with respect to light having a second wavelength which is different from said first wavelength, said second tracks have different reflectivities from each other whether or not a part of said second tracks have information recorded thereon, while said first tracks have substantially uniform reflectivity whether or not said first tracks have information recorded thereon, and wherein said recording film has a convex-concave surface unevenness that substantially matches that of said protective film, and wherein said protective film fills said surface unevenness to a flat surface, the surface of said reflective film being flat.

* * * * *